Figure 2:
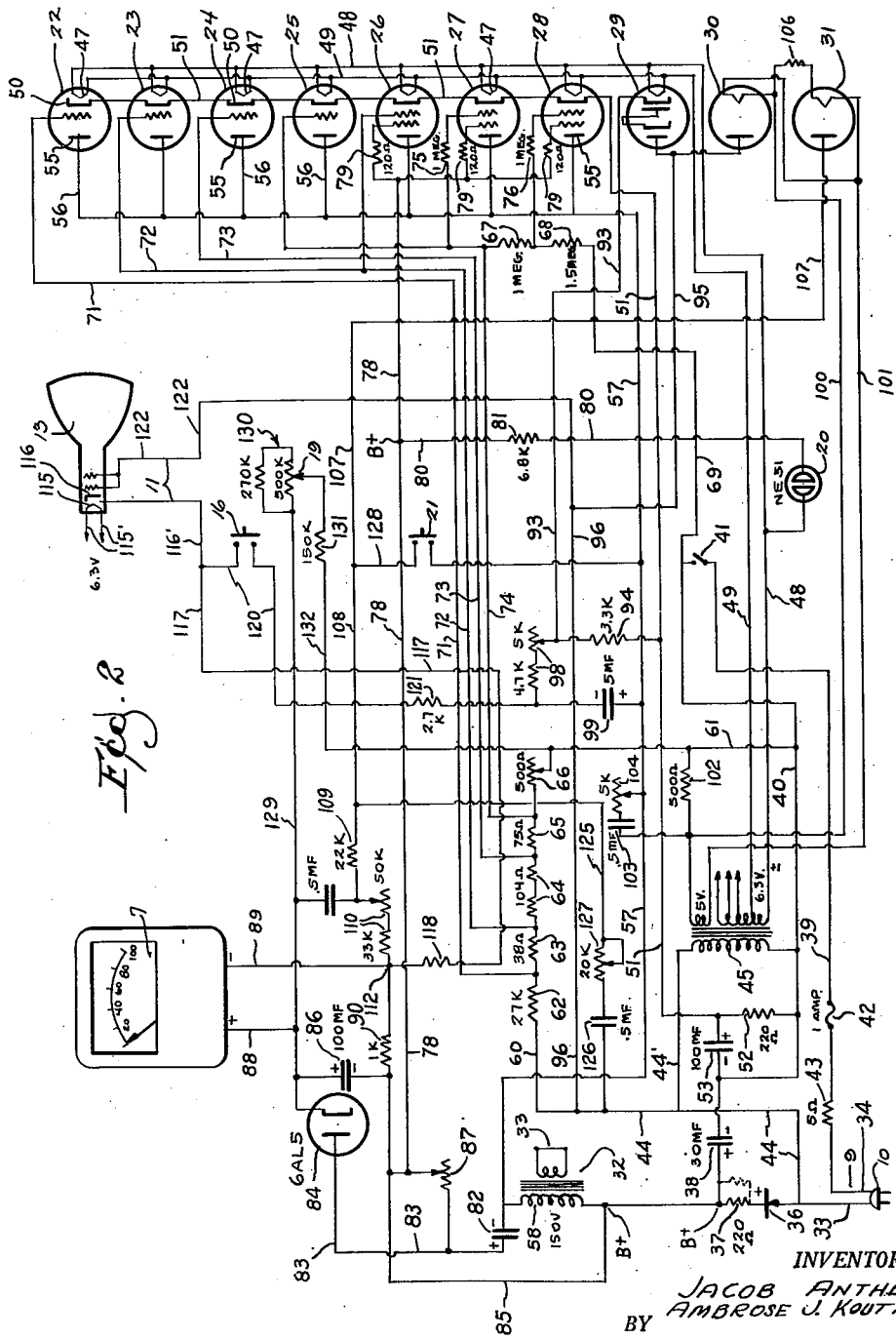

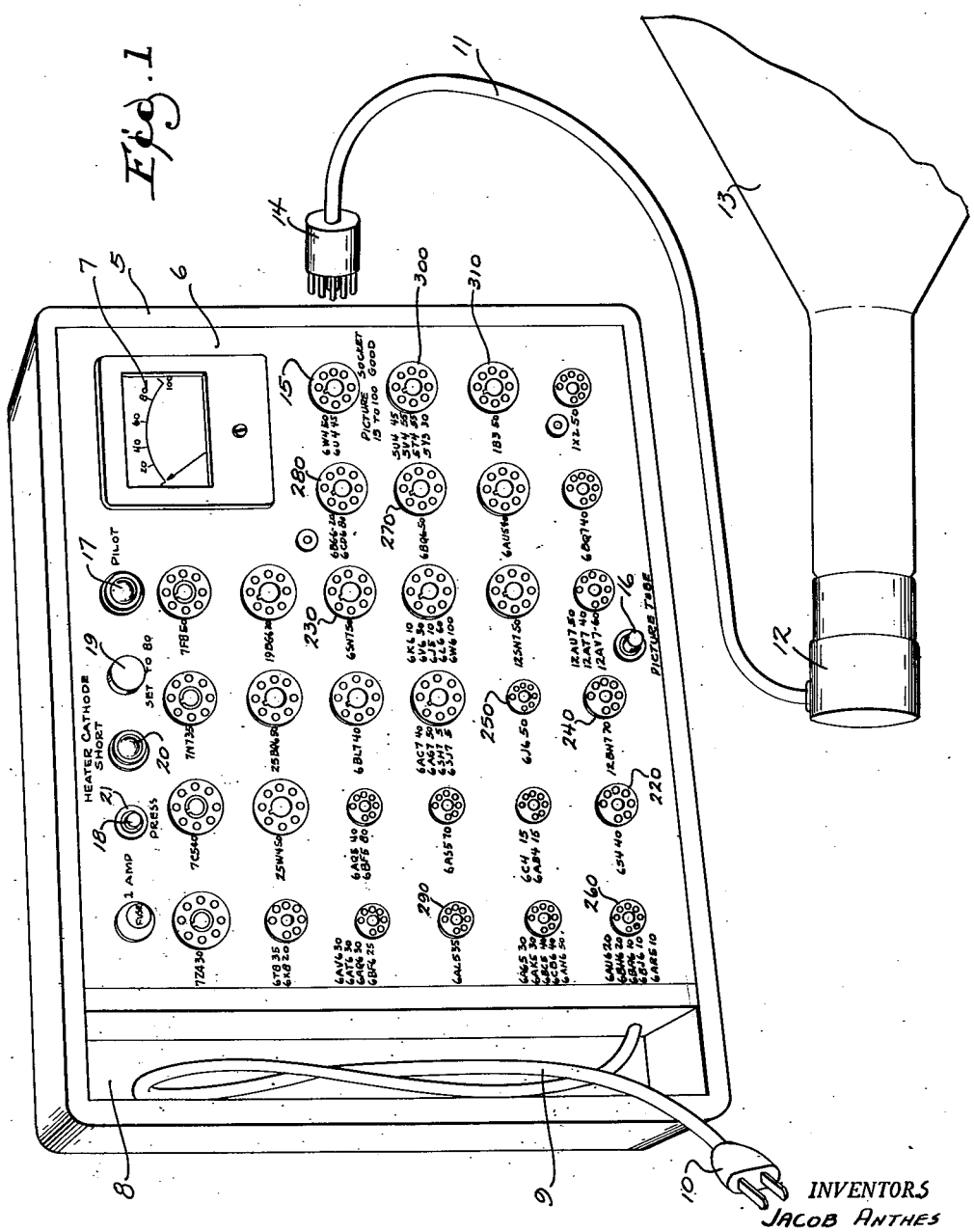

INVENTORS
JACOB ANTHES
AMBROSE J. KOUTNIK
BY
Wheeler, Wheeler & Wheeler
ATTORNEYS U*nited States Patent Office*

2,795,755
Patented June 11, 1957

2,795,755
ELECTRONIC TUBE TESTERS

Jacob Anthes, Fort Atkinson, and Ambrose J. Koutnik, Milwaukee, Wis., assignors, by mesne assignments, to U-Test-M Mfg. Co., Inc., Milwaukee, Wis., a corporation of Wisconsin Continuation of application Serial No. 300,906, July 25, 1952. This application May 31, 1956, Serial No. 593,007

5 Claims. (Cl. 324—22)

This invention comprises an electronic tube tester adapted to test tubes commonly used in television or radio sets, and is a continuation of application Serial No. 300,906, filed July 25, 1952, now abandoned.

In the conventional tube tester heretofore used, the tube to be tested was placed in a socket and a series of switches and/or rheostats set manually according to a sometimes complex code, and one or more buttons pushed in order to get a reading which would indicate the condition of the tube. In the device of the present invention the panel provides sockets for all tubes to be tested and the wiring from the meter to the sockets is complete and requires nothing but the insertion of a tube in its appropriate socket to complete the testing circuit.

In the present invention, each socket is identified with the name or number of the tube or tubes receivable therein and is also provided with cross reference indicia showing the minimum meter reading required if the particular tube is in operating condition. In consequence the tubes can not only be tested in less time than was heretofore possible, but the testing can be done by the average customer.

It is an object of the present invention to provide an electronic tube tester that will operate without complicated pre-setting by the person making the tests.

Another object is to provide an electronic tube tester which will reduce the time required to test electronic tubes.

Another object is to provide an electronic tube tester which will enable the average householder to test his own electronic tubes.

A further object is to provide an electronic tube tester which may be manufactured economically.

Other objects will become apparent from the following specification which when taken in conjunction with the accompanying drawings illustrates a preferred form of the invention.

In the drawings:

Fig. 1 is a view in front perspective of an electronic tube tester embodying the present invention, a picture tube and its connecting cord being fragmentarily illustrated; and Fig. 2 is a circuit diagram which shows the wiring connections for ten typical tubes. The tubes themselves are illustrated in Fig. 2, rather than merely sockets as shown in Fig. 1, it being understood that in practice the testing circuit is wired to the sockets in which the illustrated tubes are received. The purpose of showing the tubes in Fig. 2 is to clarify the test circuits. It will be understood that only one tube is tested in the machine at a time, and that during the testing that tube is the only tube in any socket in the panel.

Referring to the drawings, the tester is compactly organized in a case 5, having a front panel at 6, a milliammeter at 7 and a plurality of sockets adapted to receive the various types of tubes designated by the legend on the panel. The meter may be calibrated from 0 to 100, and associated adjacent each tube there may be a legend designating one or more types of tube to be tested in that socket together with a figure which represents the least meter reading at which the tube is in operating condition.

A compartment 8 in the case 5 receives an extension cord 9 with a conventional plug at 10 which may be plugged into any convenient 110 v. 60 cycle outlet to supply the tester with power. An extension cord 11 has a socket 12 in which a picture tube 13 is engageable and a plug 14 engageable in a socket 15 in the panel. The cord 11 may also be stored in the compartment 8 or in any other convenient place. To test the picture tube it is inserted in the socket 12 and the plug 14 is inserted in the socket 15, and the test made by pressing on a button type switch 16.

Other controls or indicators across the top of the panel include a push button 18 for switch 21 (Fig. 2), a neon glow lamp 20 adapted to light in the event of a cathode heater short, and a variable resistance control 19 to calibrate the meter 7. A pilot lamp 17 indicates when there is power on the tester.

The present tester is adapted to test ten different types of tubes and the circuit diagram illustrates the circuits necessary to accomplish adequate testing. However, the invention is not limited to the number of types of tubes shown, and the principles more fully described below may be applied to other tubes to determine their condition. The ten tubes shown in Fig. 2 are typical and the sockets for all the rest of the tubes are wired in parallel for some one of the typical type tubes shown.

The first tube, illustrated at 22 Fig. 2, is a triode type, of which the 6S4 tube is typical. The socket for this tube is shown on the panel at 220, Fig. 1.

The second illustrated tube 23 is a triode of type 2. Tube 6SN7 is typical of this type of tube. The socket for a 6SN7 is shown at 230, Fig. 1.

Tube 24 is a triode of a third type. An example of this type is tube 12BH7. The socket for this tube is shown in Fig. 1 at 240.

The fourth tube, numbered 25, is a triode of which tube 6J6 is typical. The socket for this type is shown at 250, Fig. 1.

Tube 26 is a pentode of which tube 6AU6 is typical. The socket for this tube is shown in Fig. 1 at 260.

The sixth tube, 27, which is a pentode is illustrated by tube 6BQ6, the socket therefor being seen at 270 Fig. 1.

Tube 28 is a pentode and is exemplified by tube 6CD6. A 6CD6 socket is shown at 280, Fig. 1.

Tube 29 is a diode rectifier type tube and is illustrated by tube 6AL5. The socket for this tube is shown at 290, Fig. 1.

The ninth illustrated tube is a low voltage rectifier 30, tube 5U4 being typical of this class. The socket for this tube is shown at 300, Fig. 1.

The tenth tube illustrated is shown at 31 and is a high voltage rectifier and is exemplified by tube 1B3. The socket for this tube is shown at 310 in Fig. 1.

Referring to Fig. 2, which shows the wiring diagram of the tester, it will be apparent that the mechanism necessary to test the tubes consists of a plurality of interdependent circuits which place the tubes to be tested under substantially operating conditions and measure the performance under these conditions.

Power to operate the tester is derived from any suitable source of 110–115 v. 60 cycle current, the connecting plug being shown at 10. One of the power wires 33 may be termed the "hot" side of the line and the other wire 34 may be termed the return or the ground.

Power enters through the line 33, passes through a selenium rectifier 36 and a resistor 37 to a point labeled B plus and returns to ground through a condenser 38, through a line 39 and 40. It will be noted on Fig. 2 that several points have been labeled B plus, these being identical in power potential. The line 40 may contain a line switch 41, a fuse 42 and a resistor 43. This circuit constitutes a half wave rectifier and filter power supply which furnishes D. C. potential with permissible ripple where needed for operation of the tester. Since the point B plus is at a positive potential with respect to the lines 34, 39, 40, the latter will be referred to hereinafter as ground or negative.

Power is supplied from the hot side of the A. C. circuit through the line 33, through the line 44 and 44' to a step-down transformer 45, return being made to ground through the lines 40, 39, 34. This transformer 45 forms a source of low voltage A. C. power for the operation of such elements as cathode heaters.

In order to clarify the wiring diagram, Fig. 2 shows sockets with representative tubes 22–31, inclusive, in place so as to show the tube elements to which the socket terminals would be connected for a tube under test in any particular socket. It is understood, however, that only one tube is to be tested at any one time and that only one test socket may contain a tube during the test.

In the following description the sockets will be referred to as though they contained the actual tubes for purposes of clarity.

The amplifier type tubes 22–28, inclusive, which includes triodes, tetrodes, pentodes or multipurpose tubes, have cathode heaters 47 which may be connected in parallel with each other through the lines 48—49 to the low voltage side of the transformer 45 which thus supplies power to the cathode heaters 47 at approximately six volts.

The connections for the cathodes 50 of the tubes are each connected in parallel to ground 34 (or negative) through a line 51, through a cathode bias resistor composed of a resistor 52 around which is shunted a condenser 53.

Electrons emitted from the cathode flow across the tube to the anode 55 of the tube being tested thence through the lines 56, 57 to a load impedance 58. The impedance may be in the form of a transformer having a shorted secondary adapted to load the tube being tested and simulate actual operating conditions for the tube.

Signal voltage for the grids of tubes 22–28, inclusive, is obtained from the 110 v. A. C. power source by means of a voltage dividing network consisting of the lines 44, 60, 61 in series with which are resistors 62, 63, 64, 65 and 66 with resistors 67 and 68 in series with each other and connected in parallel with the resistor 66 as the circuit returns to ground through the lines 61 and 69.

To supply signal voltage to the grid of tube 22 the grid is connected to the voltage divider network between the resistors 62 and 63 by a circuit including the line 71. The grids of tubes 23 and 26 are connected to the voltage dividing network through a line 72 between the resistors 63 and 64. The grid of tube 24 is connected to the voltage dividing network between the resistors 64 and 65 by a line 73. The grids of tubes 25 and 27 are connected through the line 74 to the voltage network between resistors 65 and 66 and in addition the circuit to the grid of tube 27 contains resistor 75.

The grid of tube 28 is connected to the voltage dividing network between resistors 67 and 68 through a line including a resistor 76.

The resistors in the divider network are so arranged as to give a suitable signal on the grids to enable the tube being tested to register within a predetermined range on the meter 7.

In tubes such as 26, 27 and 28 having screen grids, the screen grids are connected through a line 78 to the B plus point of the power supply. Each screen grid has a resistor 79 in series in the line to suppress parasitic oscillations.

A circuit is provided to indicate automatically a short circuit between heater and cathode of a tube under test. The shorts test is taken from the B plus side of the power line through the line 78, through the line 80, through a resistor 81, through the neon glow lamp, 20, through the line 48 or 49 to the cathode heater of a tube under test. In the event of a short circuit between heater and cathode, the shorts test circuit will be completed to ground through line 51, the resistor 52 and the line 40, and the neon lamp 20 will glow.

When a tube is being tested in one of the sockets for tubes 22–28, inclusive, an A. C. output voltage is developed across the load impedance 58. The upper end of the load impedance 58 is connected through capacitor 82 and line 83 to the plate of a rectifier 84. The lower end of the load impedance is connected through line 85 and through a capacitor 86 to the cathode of the rectifier 84. A variable resistance 87 is connected between lines 83 and 85 for purposes of a factory adjustment.

As a consequence of the output voltage across the impedance 58, a D. C. voltage is developed across the capacitor 86. The positive side of the meter 7 is connected to the positive side of the capacitor through line 88. The negative side of meter 7 is connected through line 89 and resistor 90 to the negative side of capacitor 86.

The indication on the meter 7 is therefore dependent on the D. C. voltage developed across the capacitor 86, and since the D. C. voltage across the capacitor is dependent on the A. C. output voltage developed across the impedance 58 by the tube under test, it follows that the reading on the meter is indicative of the condition of the tube being tested.

Circuit parameters are so chosen and adjusted that a tube in good condition gives an indication on the meter within prescribed limits.

In the diagram three rectifier type tubes 29, 30 and 31 are shown.

Power to the cathode heater of tube 29 is supplied by a low voltage winding of transformer 45 through lines 48 and 49. The cathode of one section of tube 29 is connected through line 93, resistor 94, line 51, and resistor 52 to ground 40. The corresponding plate of this section is connected to the cathode of the other section. The plate of the second section is connected to the hot side of the A. C. line through lines 95, 96 and 44.

Resistor 94 serves as a load for the tube 29. The A. C. components developed across the resistor 94 are coupled through variable resistor 98, capacitor 99 and line 57 to the upper end of load impedance 58. This connection to the upper end of the impedance 58 results in the development of A. C. voltages across the impedance 58 which are somewhat comparable in magnitude to those produced by the amplifier type tubes 22—28.

The indication for the tube is therefore developed on the meter in the manner described for the test of tubes 22—28 and the magnitude of the current will in all tubes lie within the range of the meter when the tube being tested is in operating condition.

Since the heater of tube 29 operates from the 6 v. winding of transformer 45, the cathode heater short test for tube 29 is the same as for tubes 22—28.

Power is supplied to the filament of tube 30 from a 5 v. winding of the transformer 45, through lines 100, 101. The plate of tube 30 is connected to the hot side of the A. C. line, through lines 95, 96, 44.

One side of the filament of tube 30 is connected to ground through line 100 and resistor 102. Resistor 102 serves as a load and the A. C. voltage components developed across resistor 102 are coupled to the upper end of load impedance 58, through capacitor 103, the variable resistor 104 and the line 57. As was the case with tube 29, the connection to the impedance 58 results in the development of A. C. voltages across the impedance 58 which due to choice of resistors and capacitors, are somewhat comparable in magnitude to those produced by the tubes 22–29 inclusive. These voltages give an indication on the meter 7 of such magnitude as to read on the meter within prescribed limits when the tube is in operating condition.

Power is supplied to the filament of tube 31 from the 5 v. winding of the transformer 45 through lines 100—101. A resistor 106 is in series with the filament to reduce the voltage across the filament to its rated voltage. One side of the filament is connected to ground 40 through the line 100, the resistor 102, and the line 61.

The plate of tube 31 is connected to B plus through lines 107, 108, resistor 109, resistor 110, resistor 90 and line 85. The plate current of tube 31 flows through line 107, 108, resistor 109, resistor 110, and divides at junction 112, a portion of the current flowing through resistor 90 to the B plus point of the power supply. The other portion of the plate current flowing to the junction 112 flows through the line 89, through the meter 7, through line 88, through the rectifier 84, through the line 83, through the resistor 87, through the line 85 to B plus.

Circuit parameters for the circuits of tube 31 are so chosen and adjusted that the portion of the current dividing at junction 112 and passing through the meter 7 gives an indication on the meter which falls within prescribed limits.

If desired the principles of testing used in testing rectifier tubes 29, 30 and 31 may be applied to amplifier tubes such as tubes 22–28 inclusive, by connecting the grids to the plates and testing the tubes as diodes.

For the picture tube 13 power is supplied to the filament 115 through lines 115′ from the 6.3 volt winding of the transformer 45.

The cathode 116 of the picture tube 13 is connected through line 116′, line 117, resistor 118 to the junction 112. The purpose of the connection just described is to remove static charges that may accumulate in the picture tube.

The cathode 116 of tube 13 is also connected through the normally open push button switch 16 through line 120, through resistor 121, through resistor 98, through resistor 94, through resistor 52 to ground 40.

All other electrodes in the picture tube 13 are connected together through line 122, line 96, line 44, to the hot side of the 110 v. A. C. line.

When switch 16 is closed the cathode is connected to ground through the resistor 98 and 94 which serve as a load in the cathode line. The A. C. components of the voltage developed across these resistors are coupled through capacitor 99, through line 57 to the upper end of load impedance 58. This connection to the upper end of the impedance 58 results in A. C. voltages across the impedance 58 which are somewhat comparable in magnitude to those produced by other types of tubes tested. The indication for the picture tube is therefore developed on the meter in the manner described for the tests of tubes 22 to 31 inclusive and the magnitude of the current will within all tubes lie within the range of the meter when the tube being tested is in operating condition.

In the event of a short circuit between the heater and cathode of tube 13, pressing the button 16 will light the neon glow light 20 to indicate the presence of the short in addition to effecting a test of the tube on the meter 7.

Provisions are made to correct for variations in the A. C. line voltage entering the tester. These provisions include a line 125 connecting lines 44 with 108, which line 125 contains a capacitor 126 and a variable resistor 127 connected in series therein.

Another provision comprises a normally open switch 21 in line 128 connected between lines 108 and 57. A still further provision comprises line 129 connected from the cathode of the rectifier 84 through a variable resistor 130 through resistor 131, through line 132 and connects with line 61 leading to ground 40.

The resistors 66, 87, 98, 104, 110 and 127 are adjusted by the manufacturer so that:

(A) when the tester is plugged into an A. C. power source of correct magnitude, the meter 7 indicates a designated value when the switch 21 is closed, and (B) with the correct A. C. line voltage supplied to the tester, a tube in good operating condition plugged into its proper socket gives a meter indication within a designated interval.

The resistors 66, 87, 98, 104, 110 and 127 cannot be adjusted from the operating panel but can be adjusted only by the manufacturer.

The tester may be supplied with a voltage other than the one for which it was designed and adjusted at the factory. In this event compensation may be made by closing switch 21 and adjusting resistor 130 so that the meter pointer is returned to the designated mark. This adjustment can be made with the control 19 (Fig. 1) on the panel of the tester, by the customer testing his tubes.

*Operation*

The tester is first plugged into a suitable source of 110–120 v. A. C. power, and the switch 41 closed to put power on the panel.

The meter 7 is then adjusted by varying the resistance 130 through the knob 19, with the switch 21 closed, until the meter needle moves to a predetermined point on the scale. The circuits are then adjusted so that an operable tube in its proper socket will register between predetermined limits on the meter scale.

The user or customer then looks up the proper socket for any particular tube either on the face of the panel or on a separate chart and the tube is plugged into that socket. Should a short circuit in any amplifier type tube be present between the cathode and the cathode heater, a circuit would be completed from B plus through line 85, through line 78, through line 80, through the neon glow light 20, through the line 48, across the short circuit to the cathode of the tube, through the line 51 and return through resistor 52 to ground 40 thus completing the circuit through the neon light and causing the light to glow, thus giving an automatic shorts test.

Amplifier type tubes as exemplified by tubes 22–28, inclusive, may be tested in the following general manner. When the tube to be tested is plugged into its proper socket power is supplied to the heater from the 6 volt secondary winding of transformer 45 through lines 48—49.

Bias voltage is provided by the cathode bias network consisting of the resistance 52 in parallel with the capacitor 53 in the line 51. Suitable signal is applied to the grid from the voltage dividing network through lines 71, 72, 73, 74 as described above. A positive D. C. potential from the B plus point of the power supply is applied to the plate through line 57 which includes the primary of transformer 58 serving as a load impedance in the plate circuit. The secondary of the transformer is shorted to draw power and simulate operating conditions of the tube. The power supply also furnishes suitable potential to the screen grid of a pentode or tetrode under test through line 78. Each screen line contains a low resistance 79 in series to suppress parasitic oscillations. The signal impressed on the grid produces an A. C. output voltage across the load impedance 58. This output voltage is rectified by the tube 84 and produces an average D. C. voltage across the capacitor 86. This voltage is applied to milliammeter 7 with a resistance 90 in series and produces an indication on the meter indicative of the condition of the tube under test.

Circuit parameters are so chosen and adjusted that an indication on the meter is equal to or greater than the value designated by the legend when the tube is in good operating condition.

Low voltage rectifier types as exemplified by tube 29 may be tested in the following general manner. When the tube to be tested is plugged into socket 29, power is supplied to the heater from the 6 volt secondary of transformer 45 through lines 48—49. If a short exists between the cathode and heater, the neon lamp 20 will glow in the same manner as for amplifier tubes previously described.

A. C. voltage from the 110 volt line is applied to the plate of the tube 29 in its socket through lines 44, 96 and 95.

The cathode of the tube is returned to ground 40 through line 93, resistors 94 and 52. A. C. voltages developed across the resistor 94 are coupled to load impedance 58 through resistor 98, capacitor 99 and line 57.

Voltages developed across impedance 58 are detected and produce an indication on meter 7 in the same manner as for amplifier types.

Low voltage rectifier type tubes as exemplified by tube 30 are tested in the following general manner.

Power is supplied to the filament for 5 volt type tubes from the 5 volt secondary winding of transformer 45 through lines 100—101.

A. C. voltage from the 110 volt line is supplied to the plate of the tube through lines 44, 96 and 95.

The filament of the tube is connected to ground 40 through resistor 102 and lines 100 and 61.

A. C. voltages developed across resistor 102 are coupled to the load impedance 58 through capacitor 103, resistor 104 and line 57.

Voltages developed across load impedance 58 are detected and produce an indication on meter 7 in the same manner as for amplifier types.

High voltage rectifier type tubes as exemplified by tube 31 are tested in the following general manner.

Power is supplied to the filament of the tube under test in the socket for tube 31 from the 5 volt winding of the transformer 45 through lines 100—101. A resistance 106 is included in series with the filament in this circuit so that the power supplied to the filament is within rated value. The filament is connected to ground 40 through line 100 and resistance 102 and line 61.

The plate is connected to the B plus of the power supply through line 107, resistance 109, 110, 90 and line 85. Plate current of tube 31 may also flow through line 107, resistors 109, 110, line 89, through the meter 7, line 88, rectifier 84, line 83, resistance 87 and line 85 to the B plus point of the power supply. Circuit parameters are so chosen and adjusted that a tube 31 in good operating condition produces an indication within predesignated limits on meter 7.

Picture tubes as exemplified by tube 13, may be tested in the following general manner. Power is supplied to the heater through lines 115' which are connected to the appropriate 6.3 secondary winding of the transformer 45. All electrodes other than the cathode are connected together and tied to the high voltage side of the A. C. line through lines 122, 96 and 44. The cathode is tied to the B plus point of the power supply through lines 116, 117, resistor 118, resistor 90 and line 85. This circuit serves to remove static charges from the tube and is not otherwise essential to the test operation. To test the picture tube a push button is depressed to close switch 16. This completes the circuit through the tube to ground 40 through line 116, 120, resistor 121, variable resistor 98, resistor 94, line 51 and resistor 52.

The A. C. components of the voltage drop across resistors 98 and 94 are coupled to the load impedance 58 through capacitor 99 and line 57. The voltages developed across the load impedance 58 is detected and indicated on the meter in the same manner as for amplifier type tubes.

The ten tubes shown in Fig. 2 are merely representative of the thirty-three sockets shown in Fig. 1, it being understood that tubes having characteristics close to the tubes shown in Fig. 2 may be connected in parallel with the tubes shown. Thus sockets 260, 280 and others on the panel are adapted to test any one of several tubes according to the legend on the panel face 6, and if the tube being tested is in serviceable condition the test will give an indication according to the figure following the tube number. For example, socket 260, in Fig. 1, is adapted to test any one of several tubes, such as 6AU6, 6BH6, 6BA6, 6BJ6, and 6AR5. Either of the first two tubes should give an indication over 20 on the meter scale in order to be in operating condition, while tubes 6BA6, 6BJ6 and 6AR5 are good when they test over 10 on the meter of the machine described.

The physical values of the resistors and capacitors shown in Fig. 2 are given by way of example only and apply only to the tester. It will be realized that various changes in types of tubes can readily be made and that such changes require corresponding changes in the values of resistors, capacitors and wiring of the circuits. It is not therefore desired to limit the invention to the precise form herein shown and described but only by the scope of the appended claims.

That which is claimed as new and is desired to be secured by United States Letters Patent is:

1. In a tube tester including a plurality of tube sockets with terminals each for quality testing one or more multi-electrode tubes having characteristics which differ from the characteristics of the tubes to be tested in the other sockets, the improvement comprising an impedance network having a plurality of intermediate taps serially dividing the impedance of said network with each tap being permanently and directly connected to a different one of said plurality of sockets to apply a proper operating test voltage to a first specified tube electrode of any tube individually inserted in its appropriate test socket, means connecting directly in multiple and applying the same voltage to the socket terminals of all of said plurality of sockets to be connected to a second specified electrode of any tube under test, a load impedance commonly connected to all said multiple-connected sockets and developing a voltage drop responsive to current flow in any tube inserted within its appropriate socket for test, a meter connected to said load impedance and responsive to current flow therein to render an indication of the quality of the tube under test, and a power supply permanently and invariably connected to the multiple connection means, the load impedance, and the impedance network and appropriately energizing any single tube during a quality test involving the meter.

2. In a tube tester including a plurality of tube sockets with terminals each for quality testing one or more tubes including at least control grid, anode and cathode electrodes and having characteristics which differ from the characteristics of the tubes to be tested in the other sockets, the improvement comprising a resistance network having a plurality of intermediate resistance taps in serial relation with respect to one another and each permanently and directly connected to a different one of said plurality of sockets to apply an operating voltage to a first specified electrode of any tube individually inserted in its appropriate test socket, means connecting directly in multiple and applying the same voltage to the socket terminals of all of said plurality of sockets to be connected to a second specified electrode of any tube under test, means connecting directly in multiple and applying the same voltage to the socket terminals of all of said plurality of sockets to be connected to a third specified electrode of any tube under test, a meter connected to the test sockets and responsive to current flow in the tube under test, and a power supply having an output connected during quality testing to the multiple connection means and the resistance network and appropriately energizing any single tube under test.

3. In a tube tester including a plurality of tube sockets with terminals each for testing one or more tubes including at least control grid, anode and cathode electrodes and having characteristics which differ from the characteristics of the tubes to be tested in the other sockets, the improvement comprising a resistance network having a plurality of intermediate resistance taps in serial relation with respect to one another and each permanently connected to a different one of said plurality of sockets to apply a proper operating voltage to the control grid electrode of any tube individually inserted in its appropriate test socket, means connecting directly in multiple and applying the same voltage to the socket terminals of all of said plurality of sockets to be connected to the anode of any tube under test, and means connecting directly in multiple and applying the same voltage to the socket terminals of all of said plurality of sockets to be connected to the cathode of any tube under test, a meter connected to the test sockets and responsive to current flow in the tube under test, and a power supply having an output invariably connected during testing to the multiple connection means and the resistance network and appropriately energizing any single tube during quality testing involving the meter.

4. In a tube tester including a plurality of tube sockets with terminals each for quality and shorts testing one or more tubes including at least control grid, anode, cathode and heater electrodes and having characteristics which differ from the characteristics of the tubes to be tested in the other sockets, the improvement comprising a resistance network having a plurality of intermediate resistance taps in serial relation with respect to one another and each permanently connected to a different one of said plurality of sockets to apply a proper operating voltage to the control grid electrode of any tube individually inserted in its appropriate test socket, means connecting in multiple the socket terminals of all of said plurality of sockets to be connected to the anode of any tube under test, and means connecting in multiple the socket terminals of all of said plurality of sockets to be connected to the cathode of any tube under test, a meter connected to the test sockets and responsive to current flow in the tube under test, a power supply having an output invariably and permanently connected during quality testing to the multiple connection means and the resistance network and appropriately energizing any single tube under test, means interconnecting the heater terminals of all of said sockets for energization from a single heater source, and a gas tube connected between said interconnected heater terminals and an output of said power supply having a potential differing from the potential applied to the multiply connected cathodes whereby said gas tube is energized in response to a short between the heater and cathode for any tube under test.

5. In a tube tester including a plurality of tube sockets with terminals each for quality testing one or more tubes including at least control grid, anode and cathode electrodes and having characteristics which differ from the characteristics of the tubes to be tested in the other sockets, the improvement comprising an impedance network having a plurality of intermediate impedance taps in serial relation with respect to one another and each permanently and directly connected to a different one of said plurality of sockets to apply an operating voltage to a first specified electrode of any tube individually inserted in its appropriate test socket, means connecting directly in multiple and applying the same voltage to the socket terminals of all of said plurality of sockets to be connected to a second specified electrode of any tube under test, means connecting directly in multiple and applying the same voltage to the socket terminals of all of said plurality of sockets to be connected to a third specified electrode of any tube under test, a load impedance commonly connected to all said multiply-connected sockets and developing a voltage drop responsive to current flow in any tube inserted within its appropriate socket for test, a meter connected to the load impedance and responsive to current flow in the tube under test, and a power supply having an output connected during quality testing to the multiple connection means, load impedance, and the impedance network and appropriately energizing any single tube under test.

References Cited in the file of this patent

UNITED STATES PATENTS

| | | |
|---|---|---|
| 1,689,871 | Goodwin | Oct. 30, 1928 |
| 1,805,094 | Hoover | May 12, 1931 |
| 2,025,163 | Goodwin | Dec. 24, 1935 |
| 2,036,347 | Miller | Apr. 7, 1936 |
| 2,042,251 | Flewelling | May 26, 1936 |
| 2,092,896 | Stinchfield | Sept. 14, 1937 |
| 2,264,066 | Buchard | Nov. 25, 1941 |
| 2,532,759 | Coate | Dec. 5, 1950 |